United States Patent [19]

Imai et al.

[11] Patent Number: 4,993,682
[45] Date of Patent: Feb. 19, 1991

[54] VIBRATION ABSORBING MOUNTING MECHANISM FOR AN AUTOMOTIVE AIR CONDITIONING COMPRESSOR

[75] Inventors: Soichiro Imai, Maebashi; Seiji Shimazaki, Isesaki, both of Japan

[73] Assignee: Sanden Corporation, Gunma, Japan

[21] Appl. No.: 344,665

[22] Filed: Apr. 28, 1989

[30] Foreign Application Priority Data

Apr. 28, 1988 [JP] Japan .............................. 63-58357[U]

[51] Int. Cl.$^5$ .............................................. F16M 1/00
[52] U.S. Cl. ..................................... 248/638; 248/635
[58] Field of Search ............... 248/666, 606, 638, 602, 248/639, 674, 635; 474/101, 114; 417/360

[56] References Cited

U.S. PATENT DOCUMENTS

| | | |
|---|---|---|
| 1,862,483 | 6/1932 | Lord . |
| 2,143,739 | 1/1939 | McCabe .............. 248/666 |
| 2,540,767 | 2/1951 | Tabbert . |
| 2,875,746 | 3/1959 | Brice .................... 248/666 |
| 2,901,195 | 8/1959 | Simpson . |
| 2,939,627 | 6/1960 | Greiner ............. 248/666 X |
| 3,053,490 | 9/1962 | Weeks ................. 248/666 |
| 3,274,394 | 9/1966 | Maheu . |
| 3,455,525 | 7/1969 | Waermo ............ 248/635 X |
| 3,476,309 | 11/1969 | Harlin . |
| 3,494,540 | 2/1970 | Dixon . |
| 3,813,776 | 6/1974 | Frederickson et al. . |
| 4,425,813 | 1/1984 | Wadensten ............ 248/635 X |
| 4,452,418 | 6/1984 | Urushihara et al. . |
| 4,503,792 | 3/1985 | Cook ..................... 474/114 |
| 4,520,987 | 6/1985 | Eguchi .................. 248/638 |
| 4,600,367 | 7/1986 | Terauchi et al. . |
| 4,666,122 | 5/1987 | Goodard . |
| 4,834,336 | 5/1989 | Shimazaki et al. . |

FOREIGN PATENT DOCUMENTS 5761252 2/1987 Japan .

*Primary Examiner*—J. Franklin Foss
*Attorney, Agent, or Firm*—Banner, Birch, McKie & Beckett

[57] ABSTRACT

A mounting mechanism for coupling a compressor to an automobile engine including a mounting bracket, at least one flange projecting from the outer peripheral surface of the compressor and a fastener for fastening each flange to the mounting bracket. The mounting bracket includes a vibration absorbing coupling mechanism for coupling each fastener to the mounting bracket and absorbing vibration generated by the compressor. The vibration absorbing coupling mechanism comprises at least one vibration absorbing unit having its longitudinal axis in substanially parallel alignment with the longitudinal axis of the compressor, while being in substantially perpendicular alignment with the center line of at least one of the fasteners.

22 Claims, 3 Drawing Sheets

VIBRATION ABSORBING MOUNTING MECHANISM FOR AN AUTOMOTIVE AIR CONDITIONING COMPRESSOR

TECHNICAL FIELD

This invention relates to a mounting mechanism for a compressor, and more particularly, to an improved mounting mechanism for connecting a compressor in an automotive air conditioning system with an automobile engine through a mounting bracket.

BACKGROUND OF THE INVENTION

A compressor, which is used in an automobile air conditioning system, is usually mounted on the engine of the automobile through a suitable mounting bracket. Referring to FIGS. 1 and 2, a conventional mounting arrangement is shown which includes four flange portions 11 extending radially from the housing of compressor 10 and bracket 20. Bracket 20 includes base portion 201 for attachment to engine 40, and flange portions 202 extending radially outwardly from base portion 201 for attachment to compressor flanges 11. Base portion 201 has a plurality of holes 22 which are formed to align with threaded holes 41 formed on the end surface of engine 40. Bracket 20 also includes flange portions 202 having threaded holes 21 which are formed to align with holes 9 formed through compressor flange portions 11. Accordingly, bracket 20 may be coupled to engine 40 by inserting threaded bolts 31 through washers 23 and holes 22 and 41. In turn, compressor 10 may be coupled to bracket 20 by inserting threaded bolts 30 through spring washers 32, washers 33 and holes 9 and 21. Compressor 10 is thus mounted on engine 40 through bracket 20.

In such a mounting construction, compressor 10 and mounting bracket 20, both of which are formed of high strength material, are directly connected through a bolt mechanism. Mechanical vibration, and more specifically vibration in the axial direction, which is generated by the operation of compressor 10, is thus transmitted directly to engine 40, causing loud noise. This noise is then transmitted from the engine compartment to the passenger compartment of the automobile.

SUMMARY OF THE INVENTION

In view of the above and other deficiencies of the known prior art, it is a primary object of the present invention to provide a mounting mechanism for mounting a compressor in an automotive air conditioning system which reduces or eliminates the transmission of vibration produced by the compressor to an automobile engine, thereby reducing or eliminating the production of objectional noise in the passenger compartment.

It is another object of the present invention to provide a mounting mechanism which absorbs compressor vibration generated in the axial direction of the compressor, while it couples the compressor to a drive, thereby preventing transmission of compressor vibration through the mounting mechanism to the drive and then to the passenger compartment.

It is yet another object of the present invention to provide a mounting mechanism including vibration absorbing mechanisms which may be readily separated from the mounting mechanism to provide cost effective replacement of the vibration absorbing mechanisms or any part thereof when a reduction in vibration absorbing quality becomes apparent.

It is a further object of the present invention to provide a mechanism for simultaneously mounting a plurality of vibration absorbing mechanisms to the mounting mechanism to increase assembly efficiencies.

It is yet a further object of the present invention to provide a mounting mechanism for a compressor in an automotive air conditioning system which has high durability.

Thus, the invention involves a mounting mechanism for coupling a compressor to an automobile engine including a mounting bracket, at least one flange projecting from the outer peripheral surface of the compressor and a fastener for fastening each flange to the mounting bracket. The mounting bracket includes a vibration absorbing coupling mechanism for coupling each fastener to the mounting bracket and absorbing vibration generated by the compressor. The vibration absorbing coupling mechanism comprises at least one vibration absorbing unit having its longitudinal axis in substantially parallel alignment with the longitudinal axis of the compressor, while being in substantially perpendicular alignment with the center line of at least one of the fasteners.

Further objects, features and advantages of the present invention will be apparent from the following detailed description of preferred embodiments with reference to the accompanying drawings.

DETAILED DESCRIPTION OF THE PREFERRED EMBODIMENTS

Figure 1:
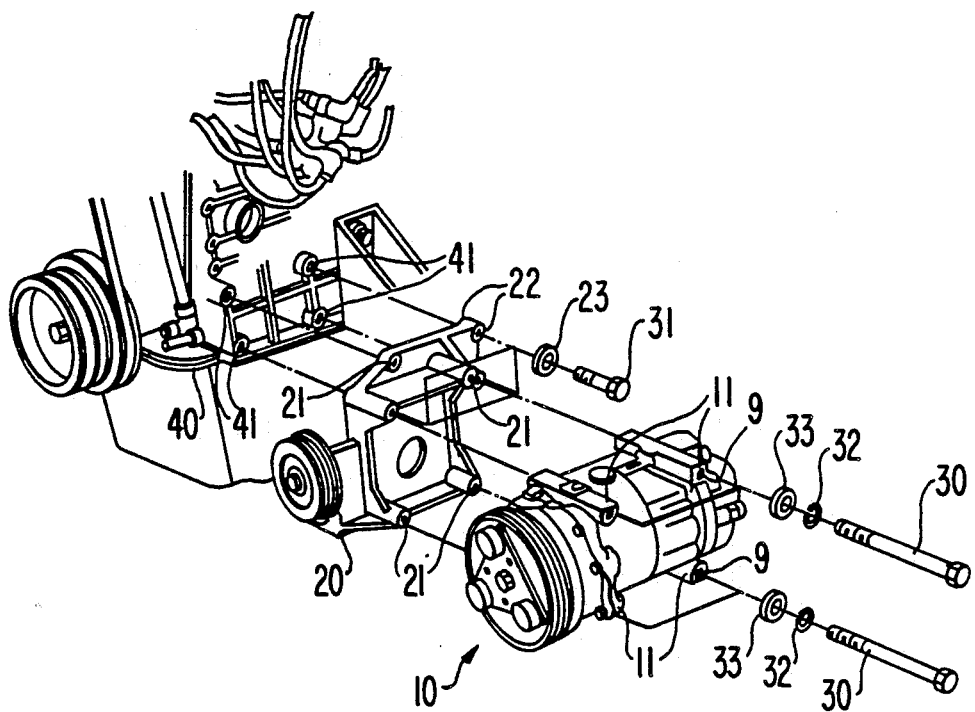
FIG. 1 is an exploded perspective view of a conventional mounting mechanism for a compressor in an automotive air conditioning system.
Figure 2:
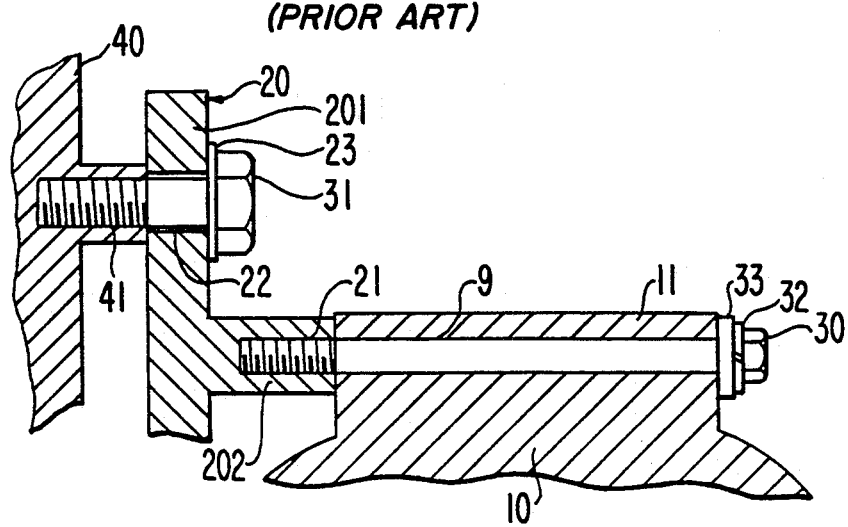
FIG. 2 is an enlarged cross-sectional view of a part of a conventional mounting mechanism for a compressor in an automotive air conditioning system as shown in FIG. 1.
Figure 3:
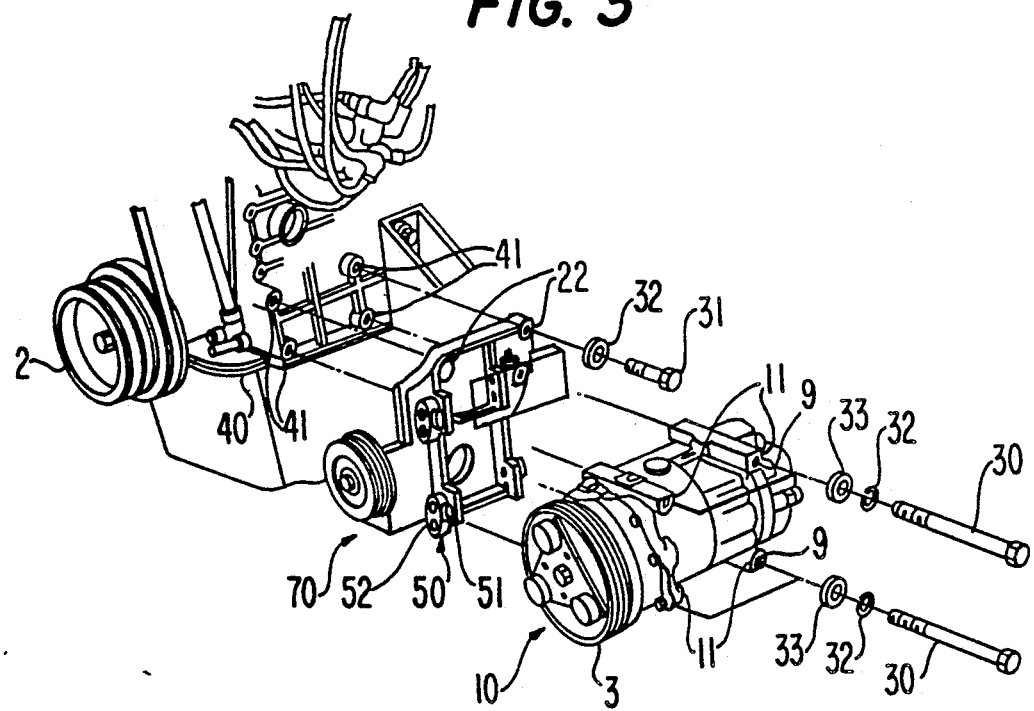
FIG. 3 is a exploded perspective view of a mounting mechanism for a compressor in an automotive air conditioning system in accordance with one embodiment of the present invention.
Figure 4:
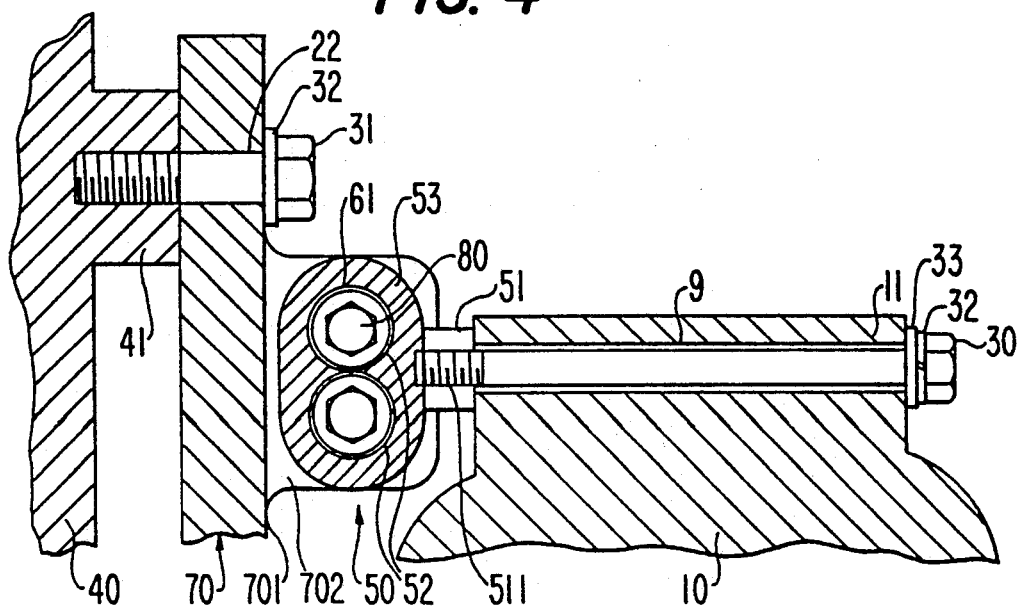
FIG. 4 is an enlarged cross-sectional view of a part of a mounting mechanism for a compressor in an automotive air conditioning system as shown in FIG. 3.
Figure 5:
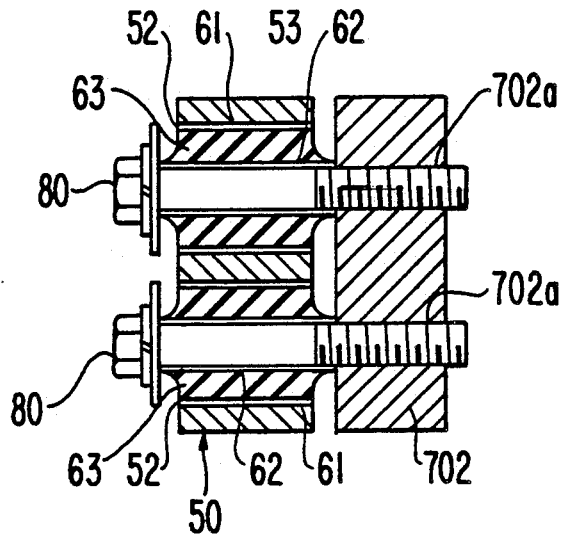
FIG. 5 is a cross-sectional view taken along line I—I as shown in FIG. 4.

Referring to the drawings in detail wherein like numerals indicate like elements, FIGS. 3, 4 and 5 show the construction of a mounting mechanism for a compressor in an automotive air conditioning system in accordance with one embodiment of this invention. Automobile engine 40 is provided with pulley 2 on the terminal end of its drive shaft for driving pulley 3 provided on the terminal end of the drive shaft of compressor 10. Rotational power from engine 40 is transmitted to compressor 10 through a drive belt (not shown), which is disposed on the outer surface of pulleys 2 and 3 to drivingly couple engine 40 to compressor 10.

Compressor 10 is mounted on automobile engine 40 through mounting bracket 70. Mounting bracket 70 includes base portion 701 affixed to the engine, when mounted thereon, and a plurality of flange portions 702 projecting outwardly from end portions of base portion 701. As can be seen while viewing FIGS. 3 and 4, flange portions 702 are perpendicular to the engine and compressor drive shafts. Therefore, when the compressor is mounted to bracket 70, flanges 702 extend in a radial direction relative to compressor 10. Bolt receiving holes 702a are formed through each flange portion 702 so that vibration absorbing mechanism 50 may be coupled with flange portion 702 by bolt 80.

Each vibration absorbing mechanism 50 includes compressor bolt or fastener receiving portion 51, vibration absorbing units 52 and outer casing 53. Each bolt or fastener receiving portion 51 extends from or is formed in outer casing 53 of vibration absorbing mechanism 50. Receiving portion 51 provides a mechanism for mounting compressor 10 to vibration absorbing mechanism 50. More specifically, receiving portion 51 includes hole 511 to receive bolt 30 which passes through compressor hole 9. Hole 511 and bolt 30 may be threaded. Casing 53 supports vibration absorbing units 52, which comprise outer shell or spacer 61 and inner shell or spacer 62. Shells 61 and 62 are preferably cylindrical and are substantially concentrically positioned with respect to one another to form an annular space therebetween. Elastic member 63, made of elastic, vibration absorbing material, such as a vibroisolating rubber, is disposed in an annular space between shells 61 and 62. Accordingly, member 63 also is preferably cylindrical. Elastic member 63 is attached on the outer surface of inner shell 62 and the inner surface of outer shell 61 by a vulcanizable adhesive.

The length of inner shell 62 is longer than that of outer shell 61 and extends beyond outer casing 53 of vibration absorbing mechanism 50 to isolate bolt 80 from casing 53. This construction provides a space between one end of bolt 80, such as the end including the bolt head, and the outer casing of vibration absorbing mechanism 50 as well as a space between the outer casing of vibration absorbing mechanism 50 and flange portion 702. The spacing prevents direct transmission of compressor vibration from casing 53 to flange 702. In other words, the vibration must pass through elastic member 63 before reaching flange 702.

Compressor 10 has a plurality of flanges 11 projecting radially outward from both end portions of the housing thereof. Hole 9 is formed through each flange 11. Bolt 30 passes through hole 9 and secures compressor 10 to receiving portion 51 of vibration absorbing mechanism 50. In turn, vibration absorbing mechanism 50 is coupled with flange portion 702 of mounting bracket 70 by bolts 80 passing through the central bore of inner shell 62. Accordingly, the longitudinal axes of vibration absorbing units 52 and bolts 80 are in substantially parallel alignment with the longitudinal axis of the compressor, while being in substantially perpendicular alignment with the center line of fastener 30. In other words, the longitudinal axes of absorbing units 52 and bolts 80 are in substantially parallel alignment with the compressor drive shaft center line as well as being in substantially perpendicular alignment with the center line of fastener 30.

When power is transmitted from engine 40 to compressor 10 through a drive belt operatively associated with pulleys 2 and 3, mechanical vibration is produced both axially (along the longitudinal axis of the compressor) and radially within compressor 10. However, mechanical axial vibration is absorbed by elastic members 63 of vibration absorbing units 52. Accordingly, transmission of noise from the engine to the passenger compartment is reduced or eliminated, thereby improving the comfort of the automobile.

Figure 6:
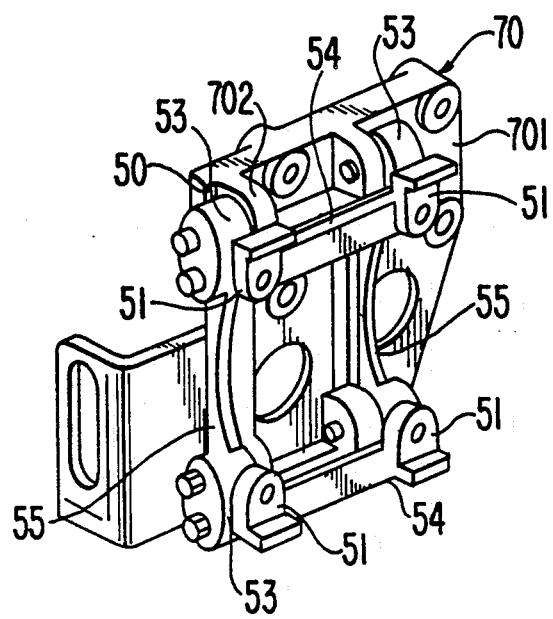
FIG. 6 is a perspective view of a mounting mechanism for a compressor in an automotive air conditioning system in accordance with another embodiment of the present invention.

Referring to FIG. 6, the construction of a mounting mechanism for a compressor in an automotive air conditioning system in accordance with another embodiment of this invention is shown wherein vibration absorbing mechanisms 50 are interconnected by ribs 54 and 55 to permit mounting absorbing mechanisms 50 as a single unit. As illustrated in FIG. 6, bolt or fastener receiving portions 51 are integrally formed in ribs 54 and vibration absorbing mechanism casings 53 is integrally formed with ribs 55. Accordingly, each casing 53 is integrally formed with one end of a rib 54 and one end of a rib 55. Therefore, absorbing mechanisms 50 are integrally connected with each other. As a result, vibration absorbing mechanisms 50 may be simultaneously mounted to mounting bracket 70, thereby increasing assembly efficiencies.

This invention has been described in detail in connection with the preferred embodiments but those are examples only and the invention is not restricted thereto. It will be easily understood by those skilled in the art that variations and modifications can be easily made within the scope of this invention.

We claim:

1. A mounting mechanism for coupling a compressor to an automobile engine including a mounting bracket, at least one flange projecting from an outer peripheral surface of the compressor and fastening means for fastening each flange to the mounting bracket, the improvement comprising:

said mounting bracket including vibration absorbing coupling means for coupling said fastening means to the mounting bracket and absorbing axial and radial vibration generated by the compressor, said vibration absorbing coupling means comprising at least one vibration absorbing unit comprising vibration absorbing material and having its longitudinal axis in substantially parallel alignment with the longitudinal axis of the compressor, while being in substantially perpendicular alignment with the center line of the fastening means.

2. The mounting mechanism of claim 1 wherein said vibration absorbing coupling means further comprises at least one casing, and each casing supports at least one of said vibration absorbing units, each casing being releasably coupled to the mounting bracket.

3. The mounting mechanism of claim 2 wherein each vibration absorbing unit comprises an inner and outer cylindrical shell substantially concentrically positioned with respect to one another and forming an annular space therebetween, said vibration absorbing material being formed in the shape of a cylinder and disposed in said annular space.

4. The mounting mechanism of claim 3 wherein said vibration absorbing material is vibroisolating rubber.

5. The mounting mechanism of claim 3 wherein each vibration absorbing unit is coupled to the mounting bracket by a bolt which passes through a central bore within said inner shell.

6. The mounting mechanism of claim 5 wherein said fastening means interconnects each compressor flange to a respective casing, and said bolt is isolated from said casing.

7. The mounting mechanism of claim 1 wherein said vibration absorbing coupling means further comprises at least one casing, and each casing supports at least one of said vibration absorbing units.

8. The mounting mechanism of claim 7 wherein each vibration absorbing unit comprises an inner and outer cylindrical shell substantially concentrically positioned with respect to one another and forming an annular space therebetween, said vibration absorbing material being formed in the shape of a cylinder and disposed in said annular space.

9. The mounting mechanism of claim 8 wherein said vibration absorbing material is vibroisolating rubber.

10. The mounting mechanism of claim 8 wherein each vibration absorbing unit is coupled to the mounting bracket by a bolt which passes through a central bore within said inner shell.

11. The mounting mechanism of claim 10 wherein said fastening means interconnects each compressor flange to a respective casing, and said bolt is isolated from said casing.

12. The mounting mechanism of claim 1 wherein said vibration absorbing coupling means further comprises a plurality of casings and each casing supports at least one vibration absorbing unit.

13. The mounting mechanism of claim 12 wherein each casing supports two vibration absorbing units.

14. The mounting mechanism of claim 13 wherein said casings are interconnected by ribs integrally formed therewith so that said casings supporting the vibration absorbing units may be simultaneously mounted to the mounting bracket.

15. The mounting mechanism of claim 12 wherein said casings are interconnected by ribs so that said casings supporting the vibration absorbing units may be simultaneously mounted to the mounting bracket.

16. In a mounting mechanism for coupling a compressor to an automobile engine including a mounting bracket, at least one flange projecting from an outer peripheral surface of the compressor, and a bolt interconnecting each flange with said mounting bracket, the improvement comprising:
said mounting bracket including vibration absorbing coupling means for coupling said bolt to the mounting bracket and absorbing vibration generated by the compressor in the axial and radial directions, said vibration absorbing means comprising at least one vibration absorbing unit comprising vibration absorbing material and having its longitudinal axis in substantially parallel alignment with the longitudinal axis of the compressor, while being in substantially perpendicular alignment with the longitudinal axis of a respective one of said bolts.

17. The mounting mechanism of claim 16 wherein said vibration absorbing coupling means further comprises at least one casing, and each casing supports at least one of said vibration absorbing units.

18. The mounting mechanism of claim 17 wherein each vibration absorbing unit comprises an inner and outer cylindrical shell substantially concentrically positioned with respect to one another and forming an annular space therebetween, said vibration absorbing material being formed in the shape of a cylinder and disposed in said annular space.

19. The mounting mechanism of claim 18 wherein said bolt interconnects each compressor flange to a respective casing, and each vibration absorbing unit is coupled to the mounting bracket by a fastener which passes through a central bore within said inner shell and is isolated from its casing.

20. In a mounting mechanism for coupling a compressor to an automobile engine including a mounting bracket, at least one flange projecting from an outer peripheral surface of the compressor, and a bolt interconnecting each flange with said mounting bracket, the improvement comprising:
said mounting bracket including vibration absorbing coupling means for coupling said bolt to the mounting bracket and absorbing vibration generated by the compressor in the axial and radial directions, said vibration absorbing means comprising at least one vibration absorbing unit comprising vibration absorbing material and having its longitudinal axis in substantially parallel alignment with the longitudinal axis of the compressor, while being in substantially perpendicular alignment with the longitudinal axis of a respective one of said bolts, said vibration absorbing coupling means further comprising at least one casing wherein each casing supports at least one of said vibration absorbing units, said bolt interconnects each compressor flange to a respective casing, and each vibration absorbing unit is coupled to the mounting bracket by a fastener which passes through a central bore formed along the longitudinal axis of said vibration absorbing unit and is isolated from its casing.

21. A mounting mechanism for coupling a compressor to an automobile engine including a mounting bracket, at least one flange projecting from an outer peripheral surface of the compressor and fastening means for fastening each flange to the mounting bracket, the improvement comprising:
said mounting bracket including vibration absorbing coupling means for coupling said fastening means to the mounting bracket and absorbing vibration generated by the compressor, said vibration absorbing coupling means comprising a plurality of casings and each casing supporting at least one vibration absorbing unit comprising vibration absorbing material and having its longitudinal axis in substantially parallel alignment with the longitudinal axis of the compressor, while being in substantially perpendicular alignment with the center line of the fastening means, said casings being interconnected by ribs so that said casings supporting said vibration absorbing units may be simultaneously mounted to the mounting bracket.

22. A mounting mechanism for coupling a compressor to an automobile engine including a mounting bracket, at least one flange projecting from an outer peripheral surface of the compressor and fastening means for fastening each flange to the mounting bracket, the improvement comprising:
said mounting bracket including vibration absorbing coupling means for coupling said fastening means to the mounting bracket and absorbing vibration generated by the compressor, said vibration absorbing coupling means comprising a plurality of casings and each casing supporting two vibration absorbing units comprising vibration absorbing material and having its longitudinal axis in substantially parallel alignment with the longitudinal axis of the compressor, while being in substantially perpendicular alignment with the center line of the fastening means, said casings being interconnected by ribs integrally formed therewith so that said casings supporting said vibration absorbing units may be simultaneously mounted to the mounting bracket.

* * * * *